United States Patent
Jang

(10) Patent No.: US 8,532,712 B2
(45) Date of Patent: Sep. 10, 2013

(54) MOBILE TERMINAL PROVIDING WEB PAGE-MERGE FUNCTION AND OPERATING METHOD OF THE MOBILE TERMINAL

(75) Inventor: Se Yoon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 504 days.

(21) Appl. No.: 12/506,486

(22) Filed: Jul. 21, 2009

(65) Prior Publication Data

US 2010/0093325 A1 Apr. 15, 2010

(30) Foreign Application Priority Data

Oct. 9, 2008 (KR) .................. 10-2008-0099302

(51) Int. Cl.
*H04M 1/00* (2006.01)
*H04B 1/38* (2006.01)

(52) U.S. Cl.
USPC ...................... 455/566; 455/414.1

(58) Field of Classification Search
USPC .......................... 455/414.1, 550.1, 566, 145;
715/201, 204, 206, 207, 208, 217, 235,
715/240, 247, 252, 273, 277, 738, 784,
715/793, 818, 838, 864

See application file for complete search history.

(56) References Cited

U.S. PATENT DOCUMENTS

| 2004/0107403 | A1* | 6/2004 | Tetzchner | 715/513 |
| 2006/0069808 | A1* | 3/2006 | Mitchell et al. | 709/246 |
| 2008/0132285 | A1* | 6/2008 | Kwak et al. | 455/566 |
| 2010/0081475 | A1* | 4/2010 | Chiang et al. | 455/564 |

* cited by examiner

*Primary Examiner* — Ping Hsieh
(74) *Attorney, Agent, or Firm* — Lee, Hong, Degerman, Kang & Waimey

(57) ABSTRACT

A mobile terminal providing a web page-merge function and an operating method of the mobile terminal are provided. The operating method includes displaying a first web page on a display module; choosing a second web page to be merged with the first web page; and merging the first and second web pages into a third web page and displaying the third web page on the display module. Therefore, it is possible to merge a number of web pages chosen by a user into a single web page and display the single web page.

14 Claims, 16 Drawing Sheets

MOBILE TERMINAL PROVIDING WEB PAGE-MERGE FUNCTION AND OPERATING METHOD OF THE MOBILE TERMINAL

CROSS-REFERENCE TO RELATED APPLICATION

Pursuant to 35 U.S.C §119(a), this application claims the benefit of earlier filing date and right of priority to Korean Patent Application No. 10-2008-0099302, filed on Oct. 9, 2008,the contents of which is incorporated herein by reference herein in its entirety.

BACKGROUND OF THE INVENTION

1. Field of the Invention

The present invention relates to a mobile terminal capable of providing a web page-merge function for merging a number of web pages chosen by a user into a single web page and displaying the single web page and an operating method of the mobile terminal.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed.

Conventionally, in order to access the internet and then navigate from one web page to another web page with a mobile terminal, back navigation and/or forward navigation may need to be performed. Particularly, in order to view two or more web pages in a row and then compare them with each other, back navigation and/or forward navigation may sometimes need to be performed repeatedly.

However, such repeated navigation operations may cause serious inconvenience. In addition, since it is difficult to display two or more web pages on a single screen, it is difficult to properly examine the contents of various web pages at the same time.

SUMMARY OF THE INVENTION

The present invention provides a mobile terminal which can allow a user to effectively examine a plurality of web pages at the same time simply through a scroll operation by merging the web pages into a single web page and displaying the single web page, and an operating method of the mobile terminal.

According to an aspect of the present invention, there is provided an operating method of a mobile terminal, the operating method including displaying a first web page on a display module; choosing a second web page to be merged with the first web page; and merging the first and second web pages into a third web page and displaying the third web page on the display module.

According to another aspect of the present invention, there is provided a mobile terminal including a display module configured to include a touch screen and display a first web page; and a controller configured to merge the first web page and a second web page chosen to be merged with the first web page into a third web page and display the third web page on the display module.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' are used interchangeably.

Figure 1:
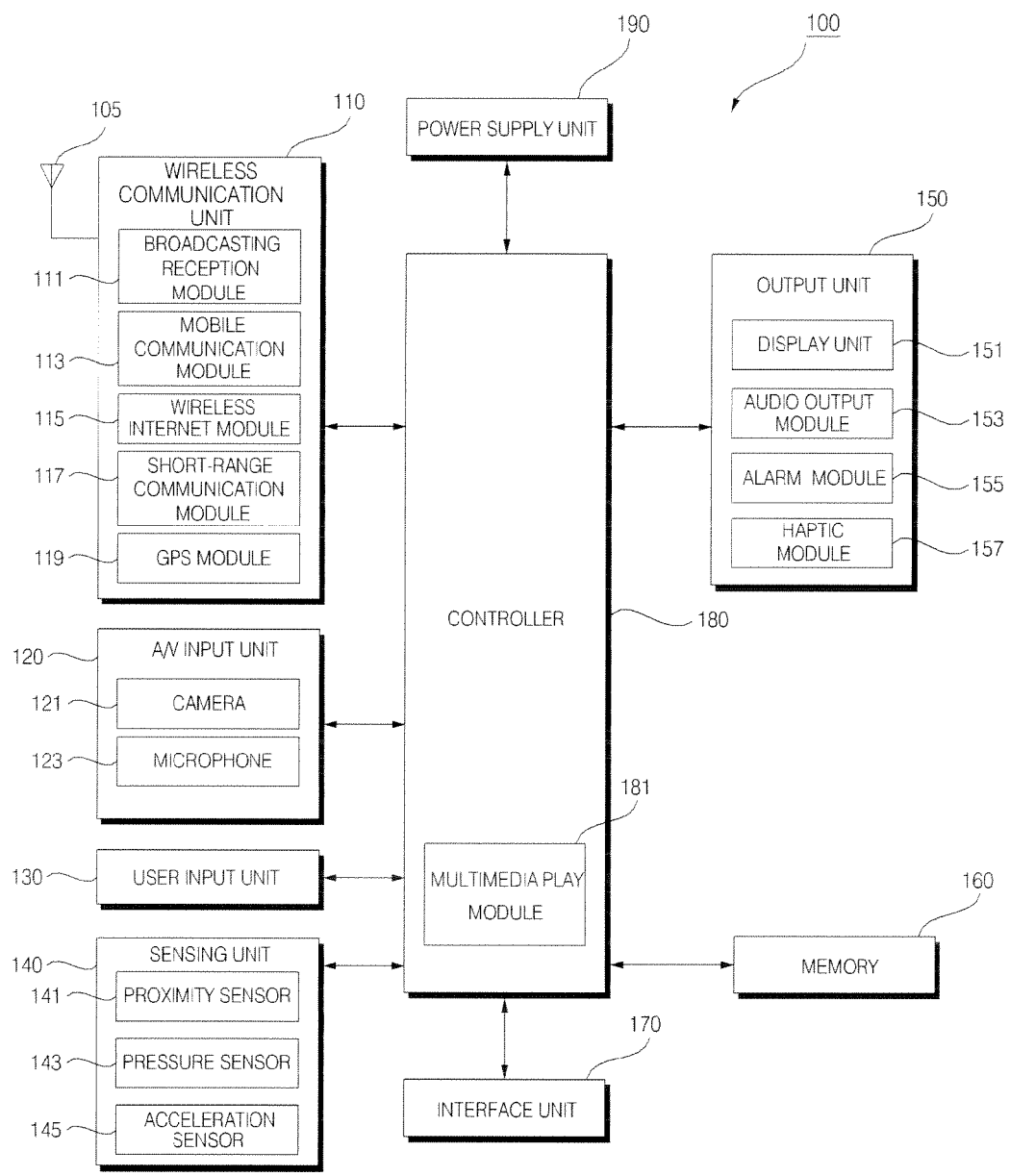
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may use various wireless internet techniques such as wireless fidelity (WiFi), wireless broadband (Wibro), world interoperability for microwave access (Wimax) or high-speed downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile terminal, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143, and an acceleration sensor 145. The proximity sensor 141 may determine whether there is an entity nearby and approaching the mobile terminal 100 without any mechanical contact with the entity. More specifically, the proximity sensor 141 may detect an entity that is nearby and approaching by detecting a change in an alternating magnetic field or the rate of change of static capacitance. The sensing unit 140 may include two or more proximity sensors 141.

The pressure sensor 143 may determine whether pressure is being applied to the mobile terminal 100 and may detect the magnitude of pressure applied to the mobile terminal 100. The pressure sensor 143 may be installed in a portion of the mobile terminal 100 in which the detection of pressure is necessary. For example, the pressure sensor 143 may be installed in the display module 151. In this case, the display module 151 may differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

Acceleration sensors are a type of device for converting an acceleration variation into an electric signal. With recent developments in micro-electromechanical system (MEMS) technology, acceleration sensors have been widely used in various products for various purposes. For example, an acceleration sensor may be installed in an airbag system for an automobile and may thus be used to detect collisions. Alternatively, an acceleration sensor may be used as an input device for a computer game and may sense the motion of the human hand during a computer game. Two or three acceleration sensors 145 representing different axial directions may be installed in the mobile terminal 100. Alternatively, only one acceleration sensor 145 representing a Z axis may be installed in the mobile terminal 100.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper may be implemented on any type of substrate such as a plastic, metallic or paper substrate and may maintain an image displayed thereon even when power is cut off. In addition, e-paper may be able to reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output a signal upon receiving a call signal or a message. In addition, the alarm module 155 may receive a key signal and may output a signal as feedback to the key signal. Therefore, the user may be able to determine whether an event has occurred based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibrations) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

If the mobile terminal 100 is connected to an external cradle, power may be supplied from the external cradle to the mobile terminal through the interface unit 170, and various command signals may be transmitted from the external cradle to the mobile terminal through the interface unit 170.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired/wireless communication system and a satellite-based communication system. The mobile terminal 100 may be configured to be able to operate in a communication system transmitting data as frames or packets.

The exterior of the mobile terminal 100 will hereinafter be described in detail with reference to FIGS. 2 and 3. For convenience, assume that the mobile terminal 100 is a slider-type mobile terminal equipped with a touch screen. However, the present invention is not restricted to a bar-type mobile terminal. Rather, the present invention can be applied to various mobile terminals, other than a slider-type mobile terminal.

Figure 2:
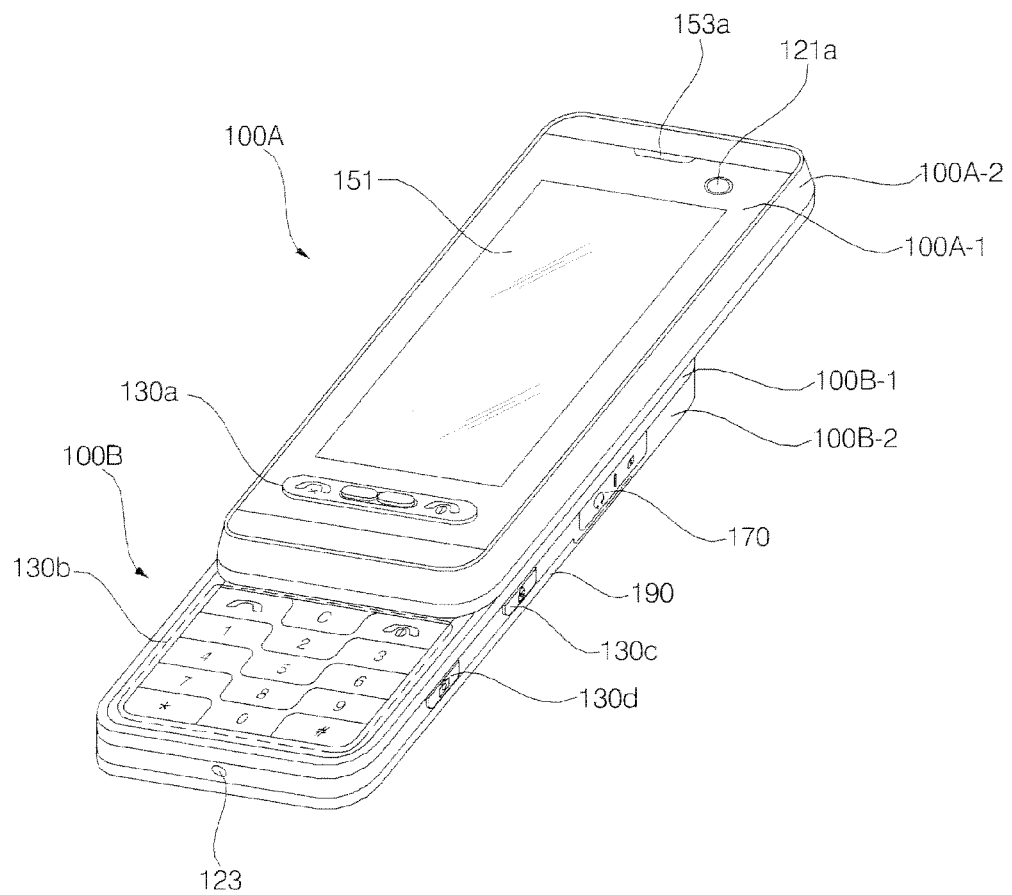
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a first body 100A and a second body 100B. The first and second bodies 100A and 100B may be configured to be able to slide up and down on each other.

When the mobile terminal 100 is closed, the first body 100A and the second body 100B overlap each other. On the other hand, referring to FIG. 2, when the mobile terminal 100 is open, the second body 100B may be at least partially exposed below the first body 100A.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

The exterior of the first body 100A may be defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. The first front case 100A-1 and the rear case 100A-2 may be formed of a synthetic resin through injection molding. Alternatively, the first front case 100A-1 and the rear case 100A-2 may be formed of a metal such as stainless steel (STS) or titanium (Ti).

The display module 151, a first audio output module 153*a*, a first camera 121*a* and a first user input unit 130*a* may be disposed in the first front case 100A-1.

Examples of the display module 151 include an LCD and an OLED which can visualize information. Since a touch pad is configured to overlap the display module 151 and thus to form a layer structure, the display module 151 may serve as a touch screen. Thus, it is possible to input various information to the mobile terminal 100 simply by touching the display module 151.

The first audio output module 153*a* may be implemented as a receiver or a speaker. The first camera 121*a* may be configured to capture a still image or a moving image of the user.

The exterior of the second body 100 may be defined by a second front case 100B-1 and a second rear case 100B-2. A second user input unit 130*b* may be disposed at the front of the second front case 100B-1. Third and fourth user input units 130*c* and 130*d*, the microphone 123 and the interface unit 170 may be disposed in the second front case 100B-1 or the second rear case 100B-2.

The first through fourth user input units 130*a* through 130*d* may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick.

The first user input unit 130*a* may allow the user to input such commands as 'start', 'end', and 'scroll', the second user input unit 130*b* may be used to input numerals, characters or symbols, and the third and fourth user input units 130*c* and 130*d* may be used as hot keys for activating certain functions of the mobile terminal 100.

The microphone 123 may be configured to properly receive the voice of the user or other sounds. The interface unit 170 may serve as a path for allowing the mobile terminal 100 to exchange data with an external device.

The power supply unit 190 supplying power to the mobile terminal 100 may be installed in the second rear case 100B-2. The power supply unit 190 may be a rechargeable battery and may be coupled to the second body 100B so as to be attachable to or detachable from the second body 100B.

Figure 3:
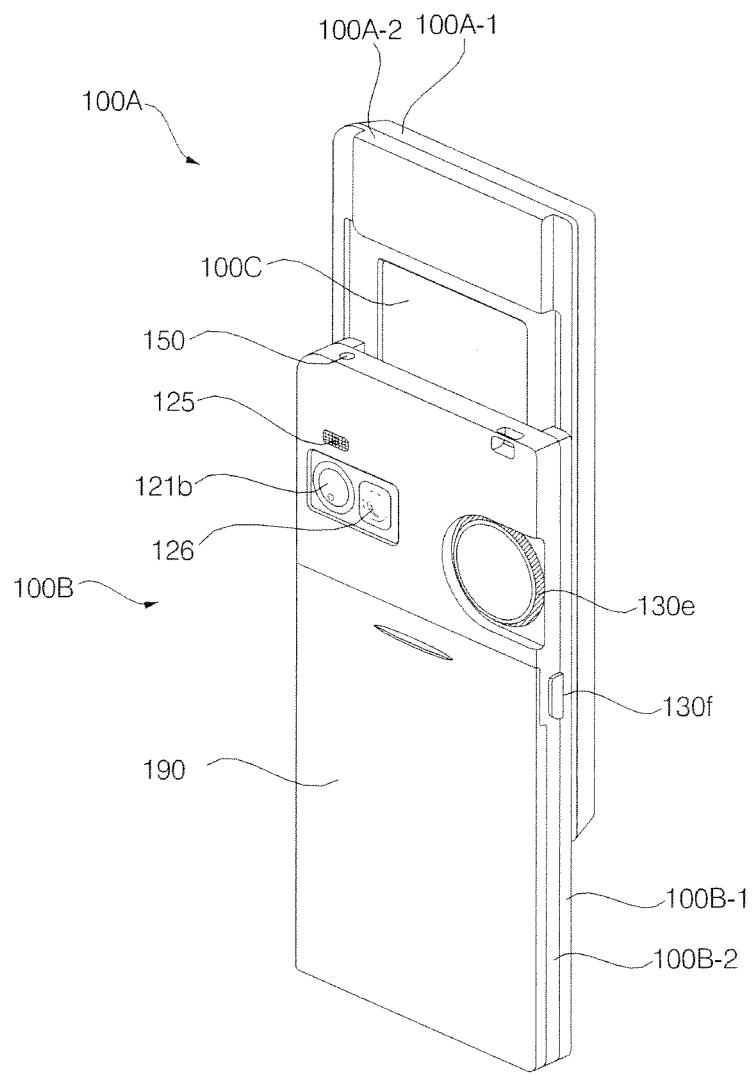
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fifth user input unit 130*e* and a second camera 121*b* may be disposed at the rear of the second rear case 100B-2 of the second body 100B. The fifth user input unit 130*e* may be of a wheel type. A sixth user input unit 130*f* may be disposed on one side of the second body 100B.

The second camera 121*b* may have a different photographing direction from that of the first camera 121*a* shown in FIG. 2. In addition, the number of pixels of the second camera 121*b* may be different from the number of pixels of the first camera 121*a*. For example, the first camera 121*a* may be used to capture an image of the face of the user and then readily transmit the captured image during a video call. Thus, a low-pixel camera may be used as the first camera 121*a*. The second camera 121*b* may be used to capture an image of an ordinary subject. Given that images captured by the second camera 121*b* generally do not need to be transmitted, a high-pixel camera may be used as the second camera 121*b*.

A camera flash 125 and a mirror 126 may be disposed near the second camera 121*b*. The camera flash 125 may illuminate a subject when the second camera 121*b* captures an image of the subject. The user may look in the mirror and prepare himself or herself for taking a self shot.

A second audio output module (not shown) may be additionally provided in the second rear case 100B-2. The second audio output module may realize a stereo function along with the first audio output module 153*a*. The second audio output module may also be used during a speaker-phone mode.

An antenna (not shown) for receiving a broadcast signal may be disposed on one side of the second rear case 100B-2. The antenna may be installed so as to be able to be pulled out of the second rear case 100B-2. A slide module 100C may be disposed between the first body 100A and the second body 100B and may couple the first body 100A and the second body 100B so as to be able to slide up and down on each other. Referring to FIG. 3, when the mobile terminal 100 is open, part of the slide module 100C may be exposed on the first rear case 100A-2 of the first body, and the rest of the slide module 100C may be hidden by the second front case 100B-1 of the second body 100B.

The second camera 121b and the fifth and sixth user input units 130e and 130f are illustrated in FIG. 3 as being provided on the second body 100B, but the present invention is not restricted to this. For example, at least one of the second camera 121b and the fifth and sixth user input units 130e and 130f may be mounted on the first body 100A, and particularly, the first rear case 100A-2. In this case, whichever of the second camera 121b and the fifth and sixth user input units 130e and 130f are mounted on the first rear case 100A-2 may be protected by the second body 100B.

In addition, the first camera 121a may be configured to be rotatable and thus to cover the photographing direction of the second camera 121b. In this case, the second camera 121b may be optional.

The power supply unit 190 may be disposed in the first rear case 100A-2. The power supply unit may be a rechargeable battery and may be coupled to the first rear case 100A-2 so as to be attachable to or detachable from the first rear case 100A-2.

Figure 4:
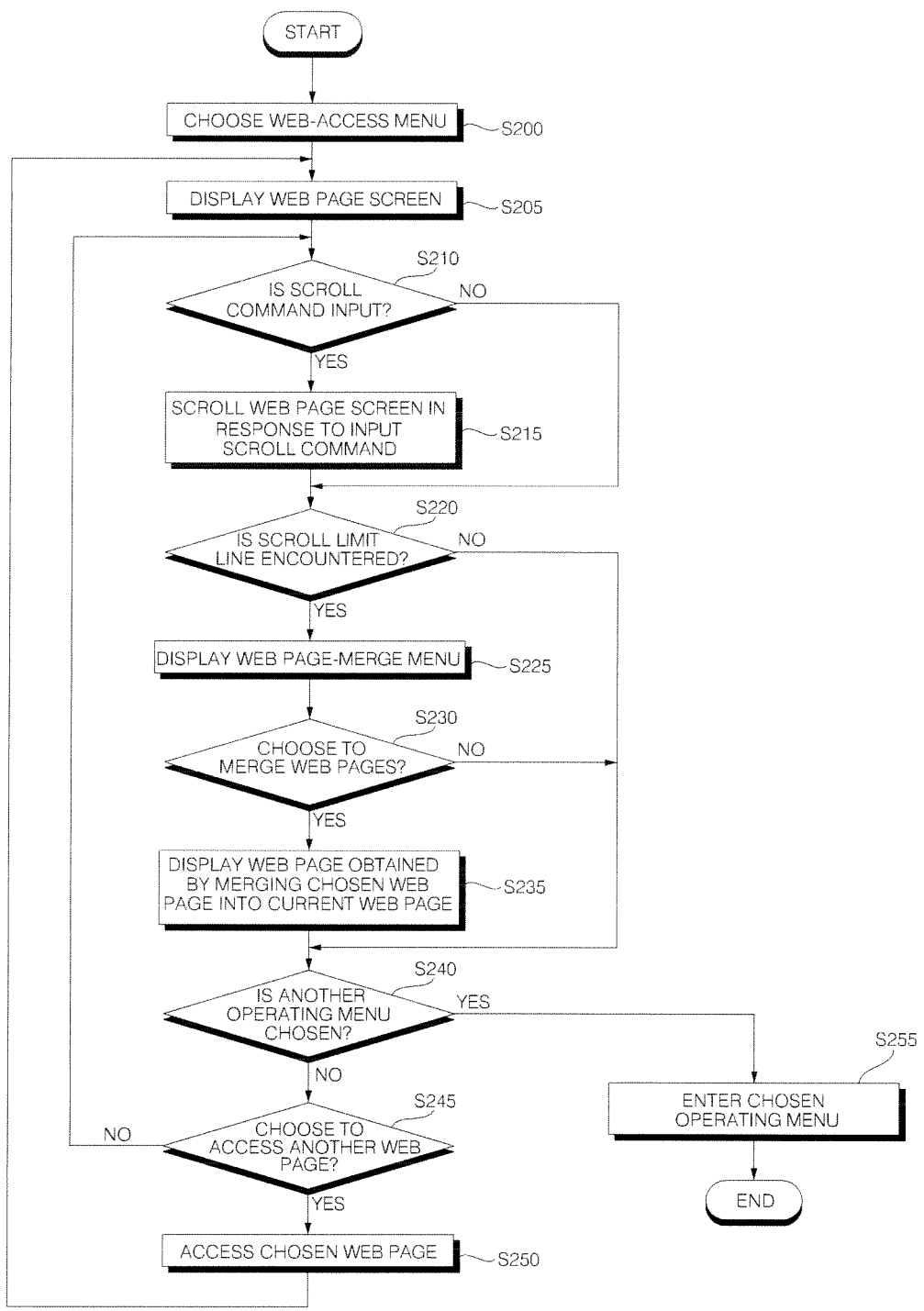
FIG. 4 illustrates a flowchart of an operating method of a mobile terminal according to an exemplary embodiment of the present invention.

FIG. 4 illustrates a flowchart of an operating method of a mobile terminal according to an exemplary embodiment of the present invention. Referring to FIG. 4, if a web-access menu is chosen in response to a user command (S200), the controller 180 may drive a web browser and may control the wireless internet module 115 to access a current web page corresponding to an input web page address. As a result, a web page screen including the current web page may be displayed on the display module 151 (S205).

Thereafter, if a scroll command is received, the controller 180 may control the web page screen to be scrolled in response to the scroll command (S215). The scroll command may be received via the user input unit 130. If the display module 151 is a touch screen and a touch input and then a drag input are received via the display module 151, the controller 180 may control the web page screen to be scrolled in a direction corresponding to the drag input.

If the web page screen is scrolled to the extent that a scroll limit line is encountered (S220), the controller 180 may display a web page-merge menu for merging two or more web pages on the display module 151 (S225). The scroll limit line is a limit line beyond which the web screen page cannot be scrolled any further. The web page-merge menu may be displayed as a popup menu.

If the user chooses to merge more than one web page (S230), the controller 180 may display a web page obtained by merging a web page chosen from the web page-merge menu into the current web page on the display module 151 (S235). The web page chosen from the web page-merge menu may be one of a number of web pages previously accessed by the wireless Internet module 115. More specifically, if the web page screen is scrolled up to the extent that an upper scroll limit line is encountered, a web page previous to the current web page may be chosen from the web page-merge menu as a web page to be merged with the current web page. On the other hand, if the web page screen is scrolled down to the extent that a lower scroll limit line is encountered, a web page subsequent to the current web page may be chosen from the web page-merge menu as the web page to be merged with the current web page.

If an operating menu (such as a multimedia mode, a camera mode or a call mode) other than the web-access menu is chosen (S240), the controller 180 may control the mobile terminal 100 to enter the chosen operating menu (S255). If a request for access to another web page is issued (S245), the controller 180 may control the wireless internet module 115 to access the corresponding web page (S250), and the method returns to operation S205. Otherwise, the method returns to operation 5210.

In this manner, it is possible to merge a number of web pages into a single web page using the web page-merge menu and efficiently examine the web pages simply by scrolling through the single web page.

Figure 5:
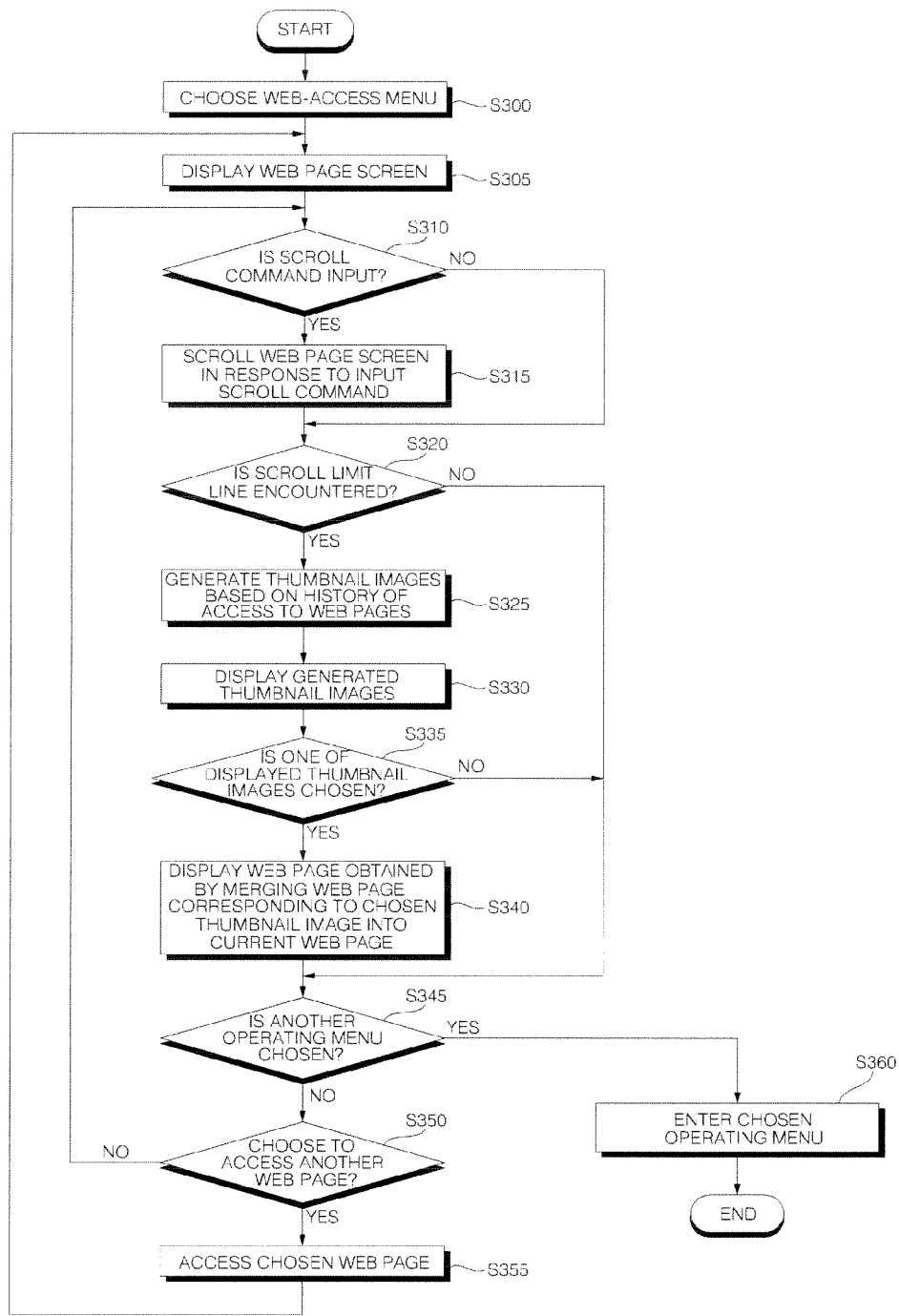
FIG. 5 illustrates a flowchart of an operating method of a mobile terminal according to another exemplary embodiment of the present invention.

FIG. 5 illustrates a flowchart of an operating method of a mobile terminal according to another exemplary embodiment of the present invention. Referring to FIG. 5, operations S300 through S315 are the same as their respective counterparts of FIG. 4.

If a web page screen including a current web page is scrolled to the extent that a scroll limit line is encountered (S320), the controller 180 may generate a plurality of thumbnail images respectively corresponding to a plurality of web pages previously accessed based on the history of access to web pages (S325). Thereafter, the controller 180 may display the thumbnail images on the display module 151 (S330). If one of the thumbnail images is chosen in response to a touch input (S335), the controller 180 may display a web page obtained by merging the web page corresponding to the chosen thumbnail image into the current web page on the display module 151 (S340). That is, the controller 180 may display a plurality of thumbnail images respectively corresponding to a plurality of web pages that can be merged with the current web page, instead of displaying a web page-merge menu, may merge the web page corresponding to one of the thumbnail images chosen by the user with the current web page, and may display a web page obtained by the merging on the display module 151.

Thereafter, if an operating menu other than a web-access menu is chosen (S345), the controller 180 may control the mobile terminal 100 to enter the chosen operating menu (S360). If a request for access to a web page other than the current web page is issued (S350), the controller 180 may access the corresponding web page (S355), and the method returns to operation S305.

In this manner, it is possible to easily choose a web page to be merged with the current web page by using a plurality of thumbnail images respectively corresponding to a plurality of previously-accessed web pages, instead of using a web page-merge menu and display a web page obtained by merging the current web page and the chosen web page on the display module 151.

FIGS. 6A through 8 illustrate diagrams for explaining the operating method shown in FIG. 4.

Figure 6A:
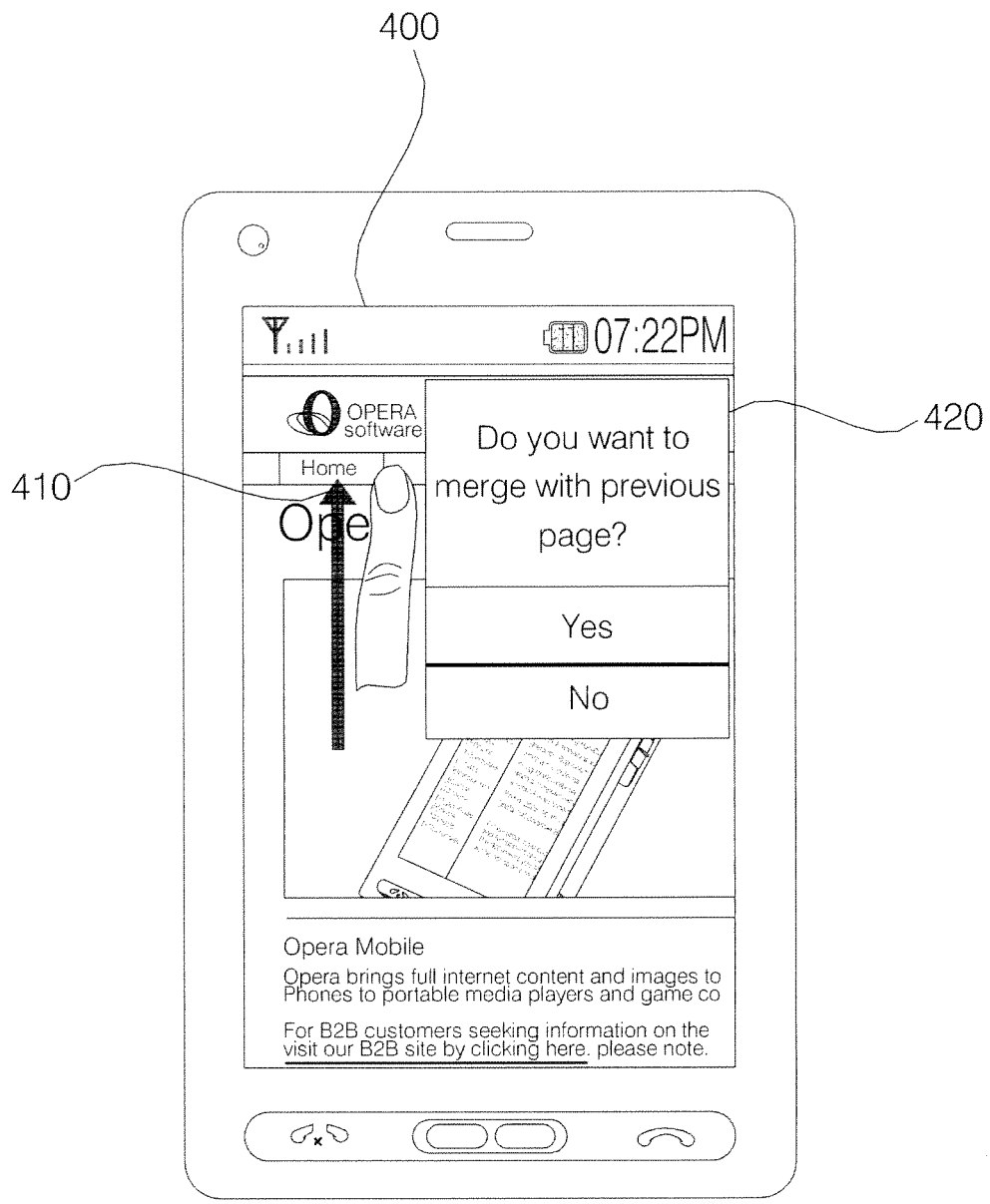
FIGS. 6A through 8 illustrate diagrams for explaining the operating method shown in FIG. 4.

Referring to FIG. 6A, if a web page 400 is scrolled up in response to a touch-and-drag input 410 to the extent that a scroll limit line is encountered, a web page-merge menu 420 may be displayed as a popup menu.

The web page-merge menu 420 may include a guide message saying "Do you want to merge the current page with the previous page?" and two items "Yes" and "No". If the user chooses the item "Yes" from the web page-merge menu 420, a web page obtained by merging the current web page 410 and a previous web page may be displayed. On the other hand, if the user chooses the item "No" from the web page-merge menu 420, the web page-merge menu 420 may automatically disappear.

Figure 6B:
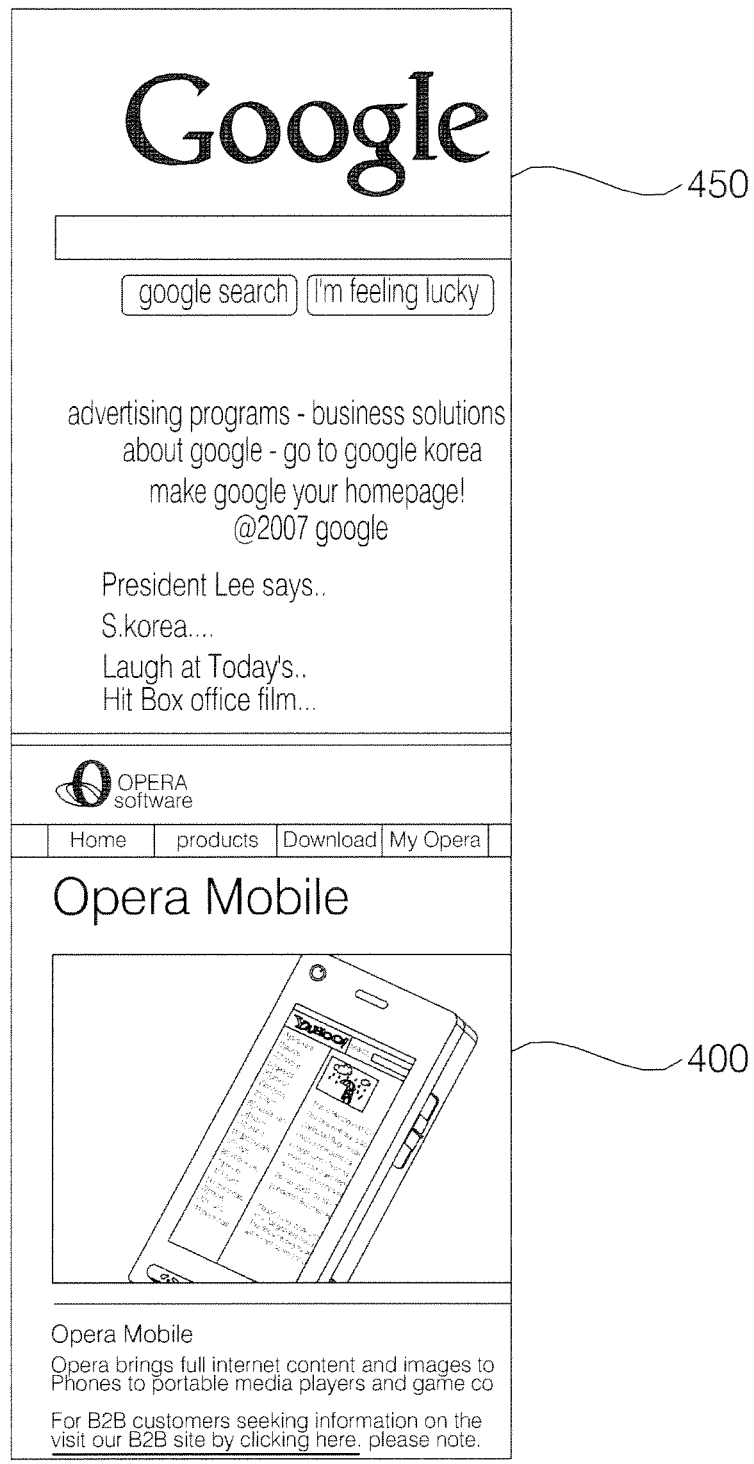
Figure 6C:
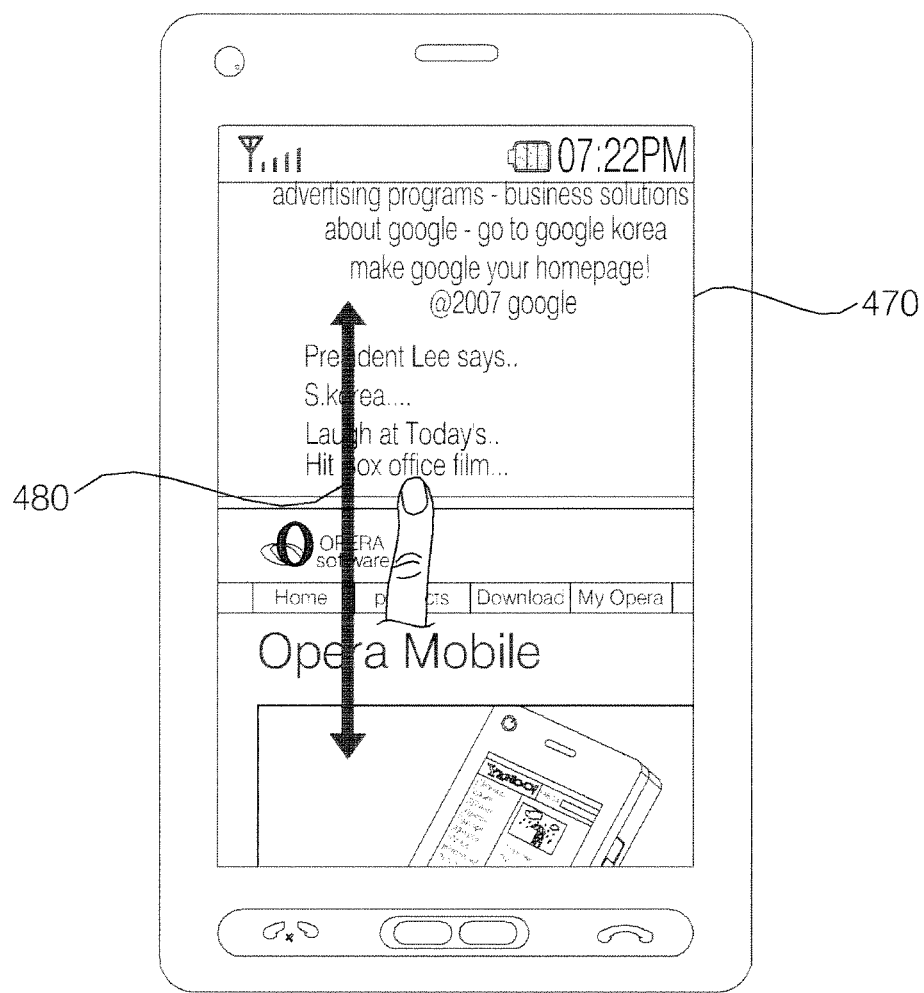

Referring to FIG. 6B, a web page 450 previous to the web page 400 may be merged into the web page 400. As a result, referring to FIG. 6C, a web page 470 may be displayed. The web page 470 may be scrolled up and down, as indicated by reference numeral 480.

Figure 7A:
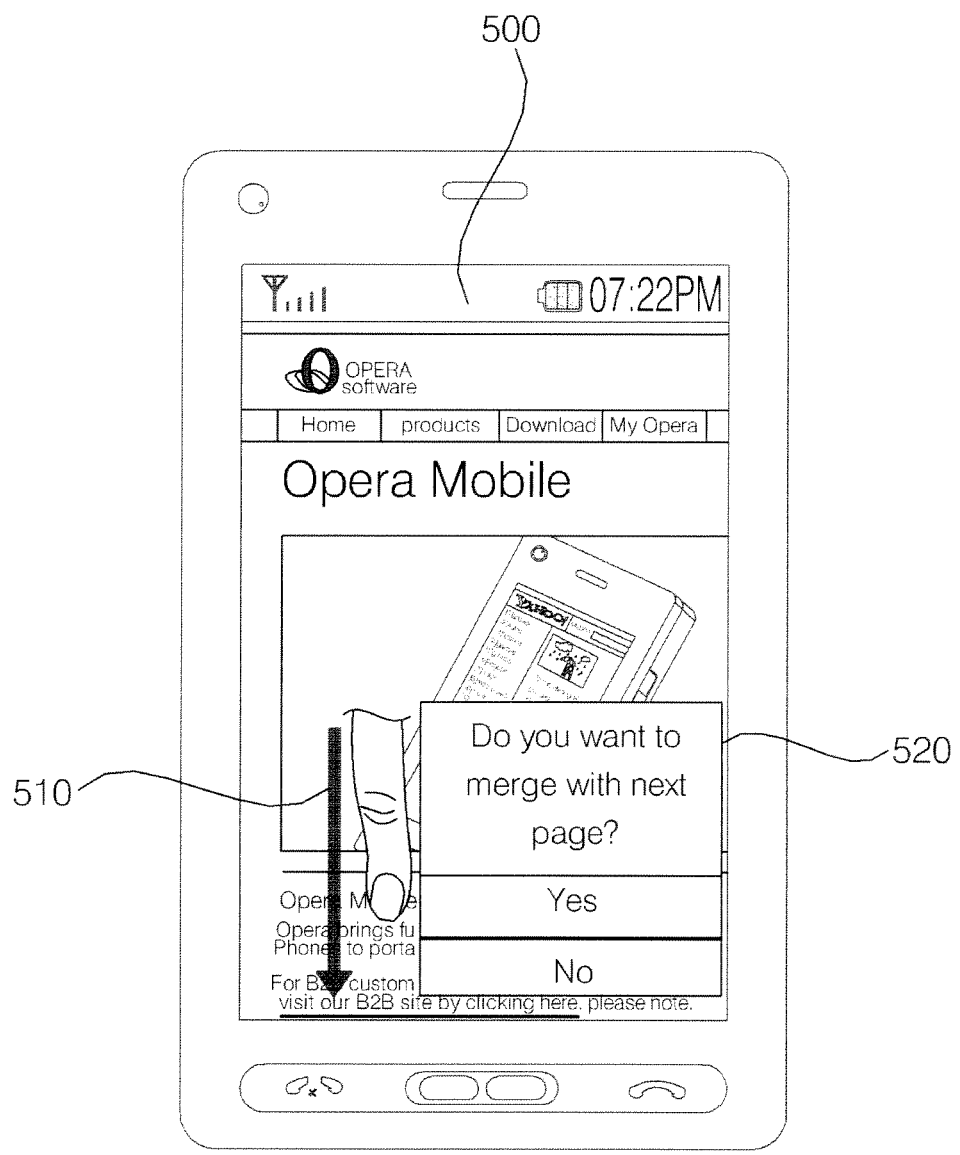
Figure 7B:
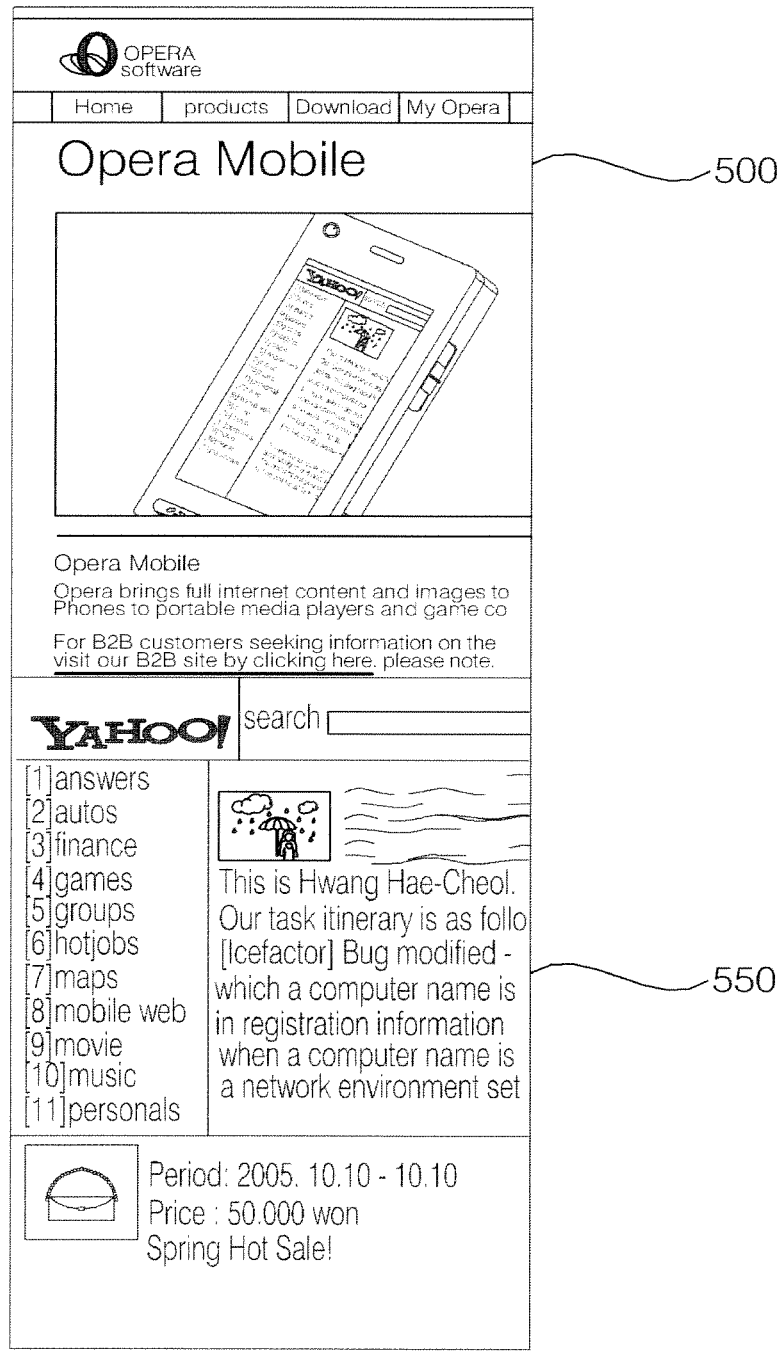
Figure 7C:
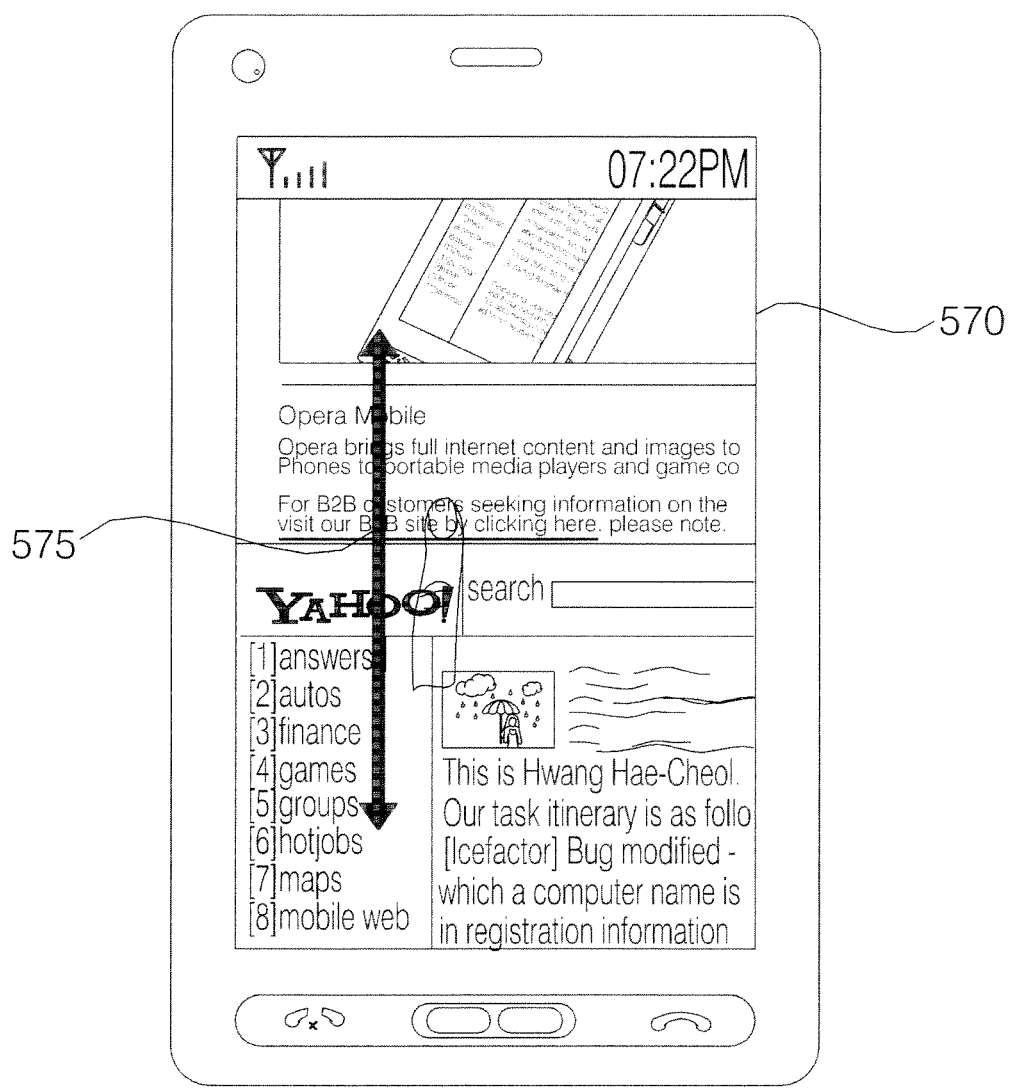

Referring FIG. 7A, if a web page 500 is scrolled down in response to a touch-and-drag input 510 to the extent that a scroll limit line is encountered, a web page-merge menu 520 may be displayed as a popup menu. However, the web page-merge menu 520 may be displayed in various manners other than that set forth herein. For example, the web page-merge menu 520 may be displayed as a semitransparent window. If the user chooses an item "Yes" from the web page-merge menu 520, a web page 550 subsequent to the web page 500 may be merged into the web page 500, as shown in FIG. 7B. As a result, referring to FIG. 7C, a web page 570 may be displayed. The web page 570 may be scrolled up and down, as indicated by reference numeral 575.

Figure 8:
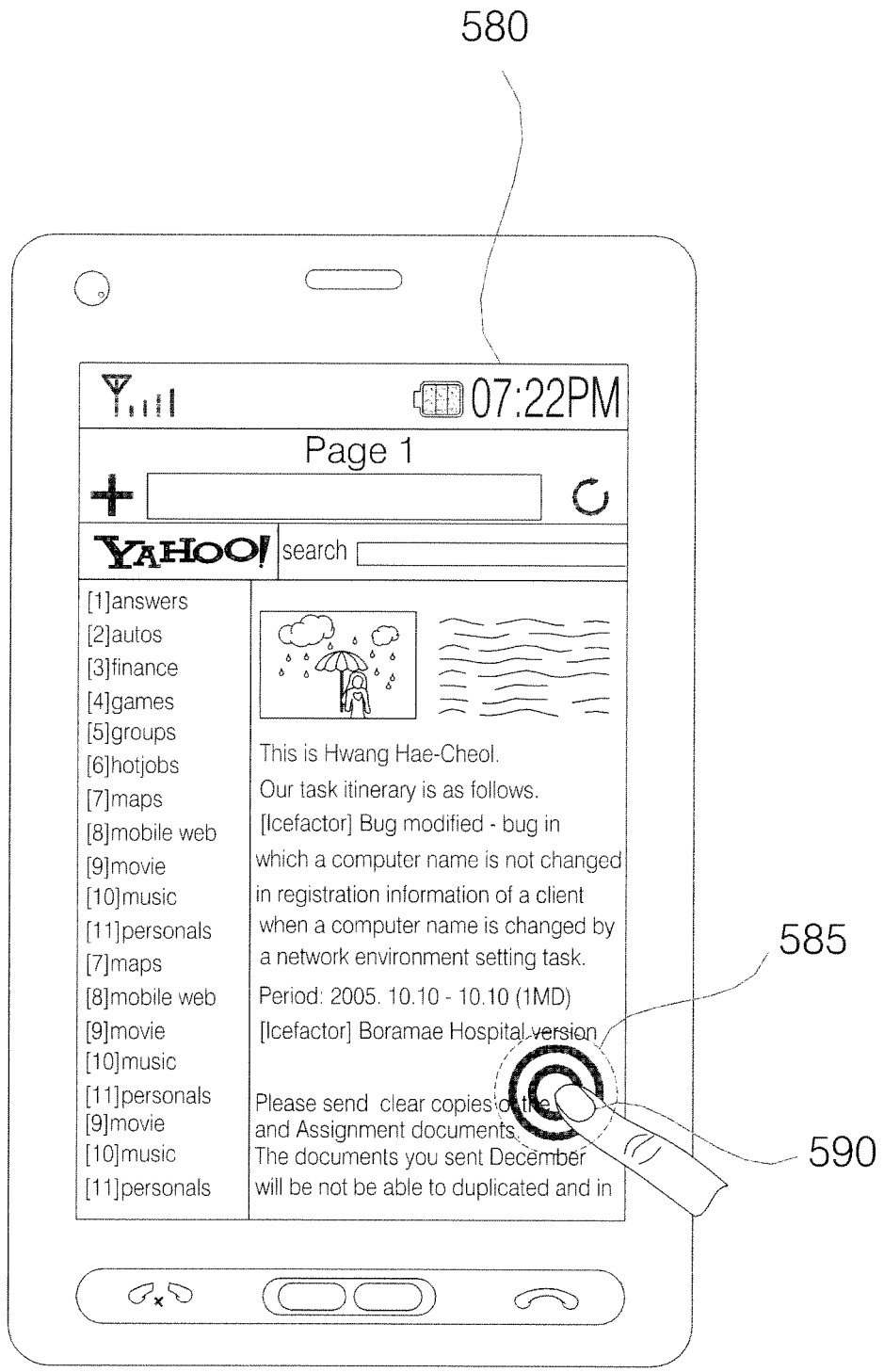

Referring to FIG. 8, if a web page 580 is scrolled up or down to the extent that a scroll limit line is encountered, an icon 585 for merging more than one web page may be displayed.

If the user touches and thus chooses the icon 590, the web page 580 may be merged with a web page previous or subsequent to the web page 580 according to whether the scroll limit line is an upper scroll limit line or a lower scroll limit line.

Figure 9A:
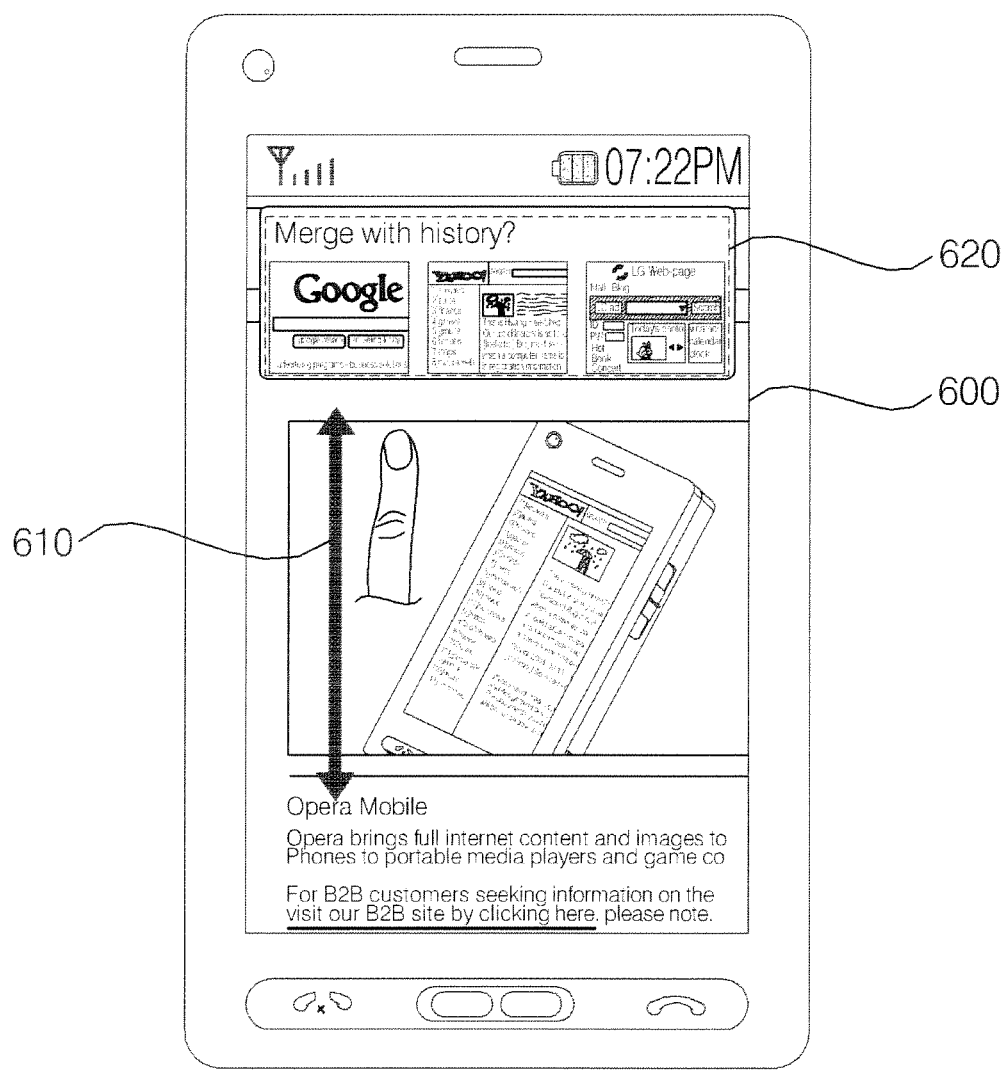
FIGS. 9A through 10 illustrate diagrams for explaining the operating method shown in FIG. 5.
Figure 9B:
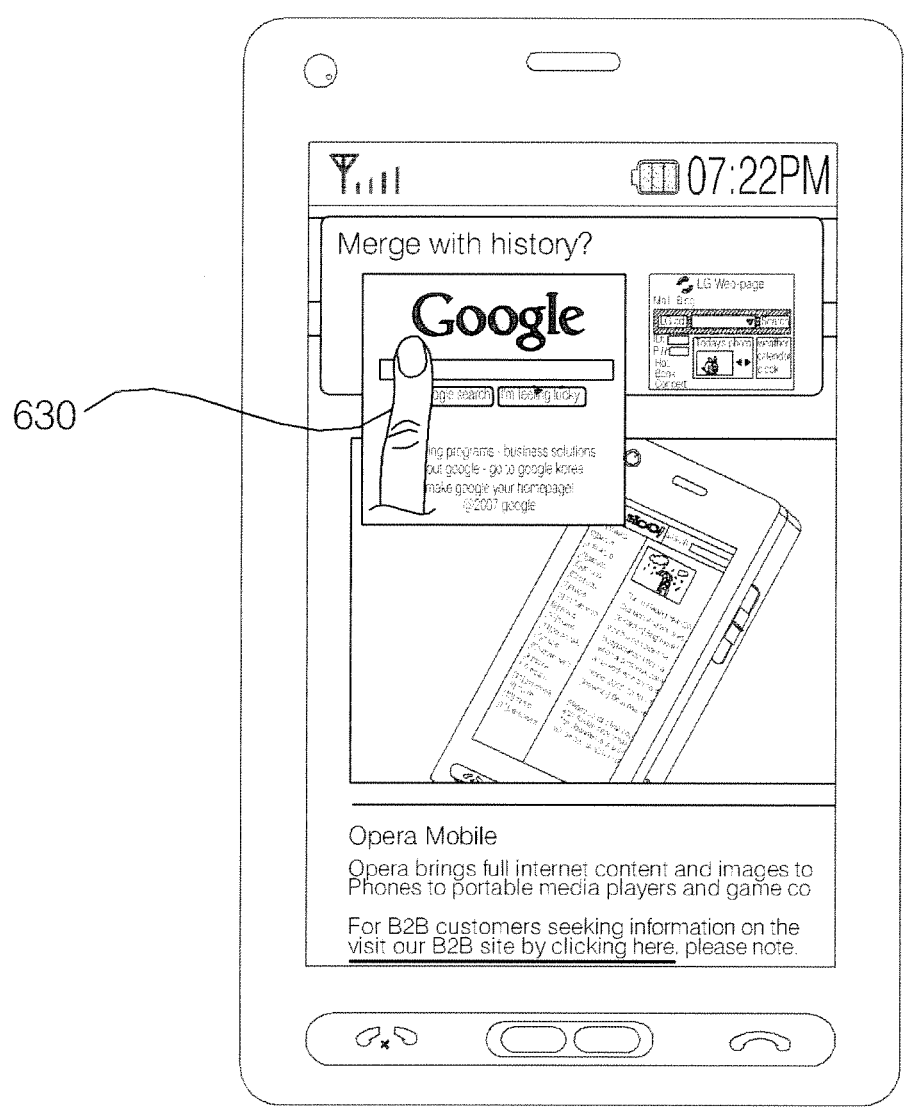
Figure 9C:
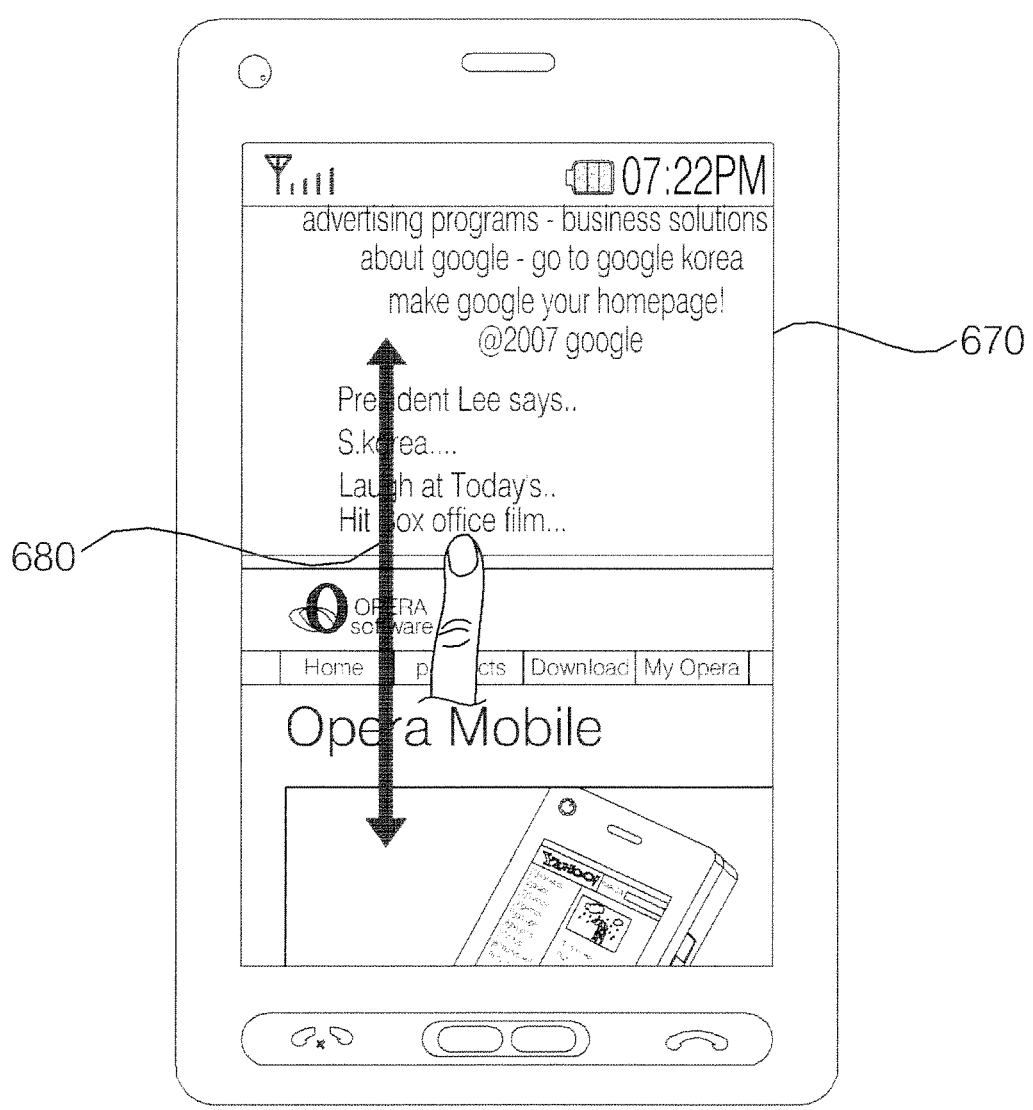
Figure 10:
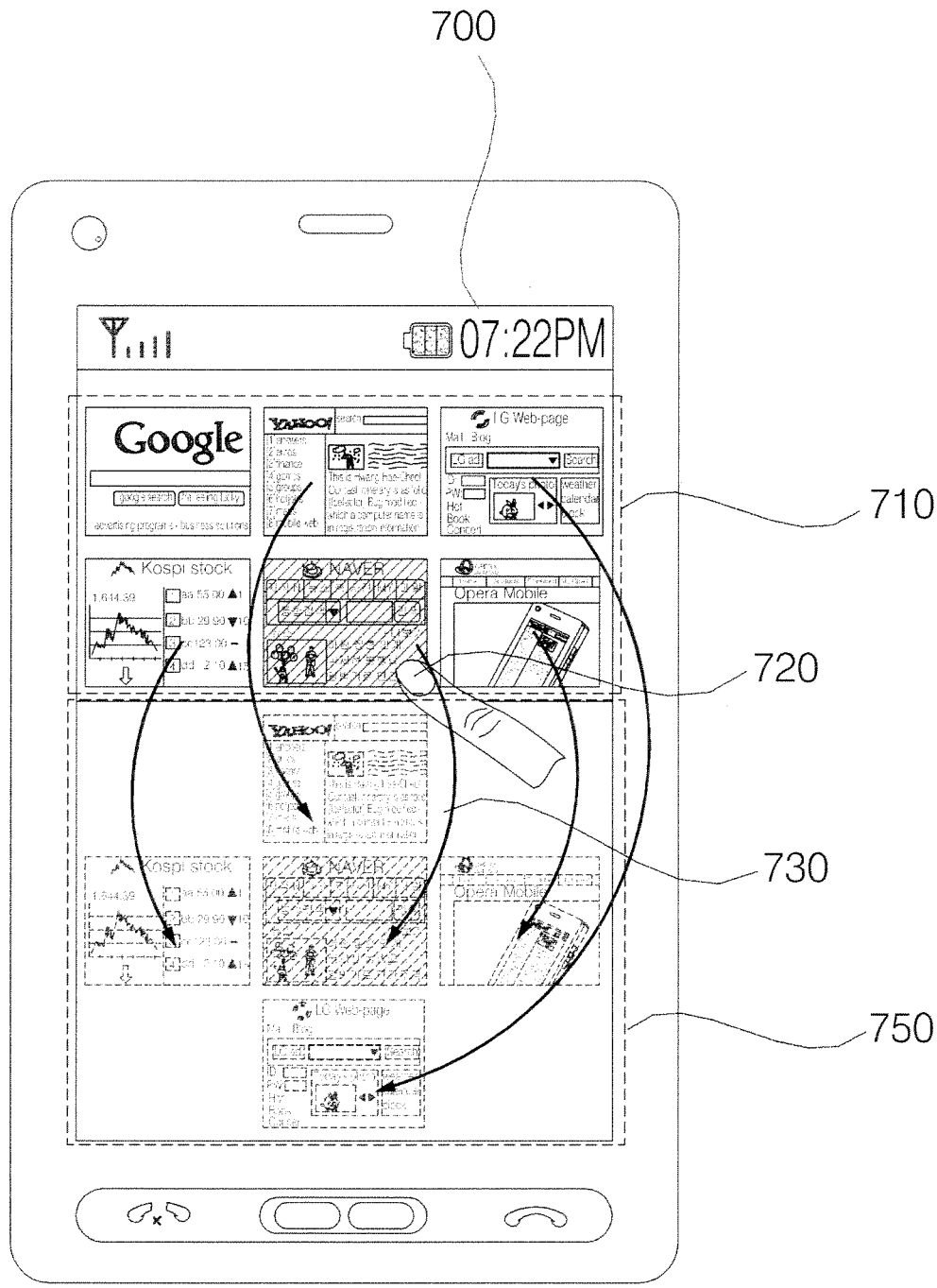

FIGS. 9A through 10 illustrate diagrams for explaining the operating method shown in FIG. 5.

Referring to FIG. 9A, if a web page 600 is scrolled up or down in response to a touch-and-drag input 610 to the extent that a scroll limit line is encountered, a plurality of thumbnail images 620 respectively corresponding to a plurality of previously-accessed web pages may be displayed.

If one of the thumbnail images 620 is approached, an enlarged image 630 of the approached thumbnail image 620 may be enlarged, as shown in FIG. 9B. If the enlarged image 630 is touched, a web page 670 obtained by merging the web page corresponding to the enlarged image 630 and the web page 600 may be displayed, as shown in FIG. 9C. The web page 670 may be scrolled up and down, as indicated by reference numeral 680.

In the meantime, if a plurality of web pages are merged into a single web page, a plurality of thumbnail images respectively corresponding to the web pages may be displayed on the display module 151. Then, if one of the thumbnail images is chosen, the controller 180 may display the web page corresponding to the chosen thumbnail image on the entire display module 151. In addition, if the thumbnail images are rearranged, the controller 180 may rearrange the web pages included in the single web page accordingly.

Referring to FIG. 10, if a web page-merge menu is chosen in response to a user command, a web page-merge menu screen 700 may be displayed. A group of thumbnail images 710 representing a plurality of web pages that can be merged may be displayed on an upper part of the web page-merge menu screen 700. An arrangement zone 750 in which one or more thumbnail images chosen from the group of thumbnail images 710 are arranged may be provided below the group of thumbnail images 710.

If the user touches one of the group of thumbnail images 710, as indicated by reference numeral 720, and then drags the touched thumbnail image 710 into the arrangement zone 750, as indicated by reference numeral 730, the dragged thumbnail image 710 may be displayed in the arrangement zone 750. In this manner, a number of thumbnail images 710 may be displayed and arranged in the arrangement zone 750. Thereafter, if the user chooses to merge the web pages respectively corresponding to the thumbnail images 710 in the arrangement zone 750, a web page obtained by merging the corresponding web pages may be displayed.

In this manner, it is possible to merge a number of web pages chosen by the user into a single web page in various manners. The mobile terminal according to the present invention and the operating method of the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to merge a plurality of web pages chosen by a user into a single web page and thus view a number of web pages at the same time simply through a scroll operation. Therefore, it is possible to facilitate web navigation. In addition, it is possible to display a plurality of web pages at the same time on a single display module by merging the web pages into a single web page.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed:

1. A method of operating a mobile terminal, the method comprising:

displaying at least one of a first web page on a display module of the mobile terminal, the first web page scrollable in response to a user command;

providing an option to select a second web page to be merged into the first web page while the at least one portion of the first web page is being displayed, the first web page separate from the second web page, wherein providing the option comprises displaying at least one predetermined image for selecting the second web page on the displayed at least one portion of the first web page in response to a user input;

merging the second web page corresponding to a selected one of the at least one predetermined image into the first web page when the one of the at least one predetermined image is selected; and displaying the merged first and second web pages on the display module such that the merged first and second web pages are scrollable in at least a horizontal or vertical direction.

2. The method of claim 1, wherein providing the option further comprises sensing an edge of the first web page when the first web page is scrolled to the edge.

3. The method of claim 2, wherein providing the option further comprises:
displaying an icon image when the scrolled first web page reaches the edge; and
merging the second web page into the first web page when the icon image is selected.

4. The method of claim 2, wherein providing the option further comprises:
sensing a first edge type of the first web page; and
providing the option to merge a previously displayed second web page.

5. The method of claim 2, wherein providing the option further comprises:
sensing a first edge type of the first web page; and
providing the option to merge a subsequently displayed second web page.

6. The method of claim 2, wherein providing the option further comprises:
displaying an option menu having a textual listing of the second web page when the scrolled first web page reaches the edge; and
merging the second web page into the first web page when the textual listing is selected.

7. The method of claim 2, wherein providing the option further comprises:
displaying at least one thumbnail image corresponding to at least one web page that is previously accessed when the scrolled first web page reaches the edge; and
merging the second web page corresponding to a selected thumbnail image into the first web page when one of the at least one thumbnail image is selected.

8. The method of claim 7, wherein providing the option further comprises:
displaying an enlarged image of the one of the at least one thumbnail image; and
merging the second web page into the first web page when the enlarged image is selected.

9. The method of claim 7, wherein providing the option further comprises:
displaying a plurality of thumbnail images corresponding to a plurality of web pages; and
merging at least one of the plurality of web pages corresponding to at least one selected thumbnail image of the plurality of thumbnail images into the first web page when the least one thumbnail image of the plurality of thumbnail images is selected.

10. The method of claim 9, wherein providing the option further comprises:
configuring the plurality of thumbnail images in an arrangement relative to the first web page in order to allow scrolling of the merged web pages in multiple directions when merging to a first and a second edge type of the first web page such that the first edge type scrolls horizontally and the second edge type scrolls vertically.

11. A mobile terminal, comprising:
a display module configured to display at least one web page; and
a controller configured to:
control the display module to display at least one portion of a first web page of the at least one web page, the web page scrollable in response to a user command;
control the display module to display at least one predetermined image for selecting a second web page to be merged into the first web page on the displayed at least one portion of the first web page in response to a user input while the at least one portion of the first web page is being displayed, the first web page separate from the second web page;
merge the second web page corresponding to a selected one of the at least one predetermined image into the first web page when the one of at least one predetermined image is selected; and
control the display module to display the merged first and second web pages such that the merged first and second web pages are scrollable in at least a horizontal or vertical direction.

12. The mobile terminal of claim 11, wherein:
the at the predetermined image is an option menu having a textual listing of the second web page; and
the controller is further configured to control the display module to merge the second web page into the first web page when the textual listing is selected.

13. The mobile terminal of claim 11, wherein:
the at least one predetermined image is an icon image; and
the controller is further configured to control the display module to merge the second web page into the first web page when the icon image is selected.

14. The mobile terminal of claim 11, wherein:
the at least one predetermined image is at least one thumbnail image corresponding to at least one previously accessed web page; and
the controller is further configured to control the display module to merge the second web page corresponding to a selected thumbnail image of the at least one thumbnail image into the first web page when a thumbnail image of the at least one thumbnail image is selected.

* * * * *